Nov. 11, 1969　　　W. W. OELKE ET AL　　　3,477,840
GLASS SHEET PRESS BENDING MOLD
Filed June 15, 1966

INVENTORS
Waldemar W. Oelke, Frank J. Carson
Alfred E. Badger and
Thomas B. O'Connell
Nobbe & Collins
ATTORNEYS 3,477,840
GLASS SHEET PRESS BENDING MOLD
Waldemar W. Oelke, Rossford, Frank J. Carson, Toledo, Alfred E. Badger, Maumee, and Thomas B. O'Connell, Toledo, Ohio, assignors to Libbey-Owens-Ford Company, Toledo, Ohio, a corporation of Ohio
Filed June 15, 1966, Ser. No. 557,728
Int. Cl. C03b 23/02
U.S. Cl. 65—287   6 Claims

ABSTRACT OF THE DISCLOSURE

Apparatus for bending glass sheets including a hollow mold member having a porous shaping surface through which an aeriform fluid is allowed to pass to from a quiescent film of fluid in contact with the sheet while it is being bent. Means are provided for supporting the sheet in a vertical position and for guiding it along a path past the mold, said guide means including a notch to allow the sheet to fall away from the guide means and be deposited against the mold.

---

The present invention relates generally to the production of curved sheets of glass by press bending techniques wherein the heat-softened sheets of glass are pressed to a desired curvature between complemental shaping surfaces formed on a shaping mold. More particularly the invention is concerned with an improved shaping mold for bending glass sheets.

By way of background, the increased use in recent years of curved glass sheets as glazing closures, particularly as windows in automotive vehicles, has inspired the development of automatic manufacturing procedures and apparatus designed to produce curved glass sheets in large quantities with a minimum of manual labor being required. In these procedures, substantially flat sheets of glass are heated to an elevated temperature corresponding to the softening point of glass and then pressed to the desired curvature between complemental shaping surfaces formed on a shaping mold. After being bent, the curved glass sheets are usually tempered to increase the strength of the glass and modify its breaking characteristics whereby, when broken, the tempered sheets disintegrate into small relatively harmless particles rather than into large, jagged pieces such as result when untempered glass is broken.

To be commercially practical, the procedures followed should be capable of producing curved sheets which meet very close dimensional and optical tolerances and, therefore, the apparatus should be capable of bending the sheets accurately to precisely defined curvatures without marring or in any way damaging the surfaces of the sheets which lie within the viewing area of the finished window.

The aim then of the invention is to provide an improved bending mold for bending glass sheets to these precisely defined curvatures without injury to the surfaces of the sheets.

Another object is to accomplish the foregoing by pressing heated sheets between accurately contoured shaping surfaces while at the same time avoiding direct contact between the heat-softened sheets and these surfaces.

Another object is to avoid direct contact between the shaping surfaces on the mold and the glass sheets by providing a thin, hard, contoured film of aeriform fluid or gas between the shaping surfaces and the sheets.

Another object is to provide an improved bending mold having porous shaping surfaces through which a fluid or gas may be directed during the press bending operation thereby to provide an air film separating the shaping surfaces and the sheet being bent.

Still another object is to provide a film of fluid or gas between the mold and the sheet to retard heat flow between the mold and the sheet.

Other objects and advantages of the invention will become more apparent during the course of the following description when taken in connection with the accompanying drawings.

In the drawings, wherein like numerals are employed to designate like parts throughout the same:

Figure 1:
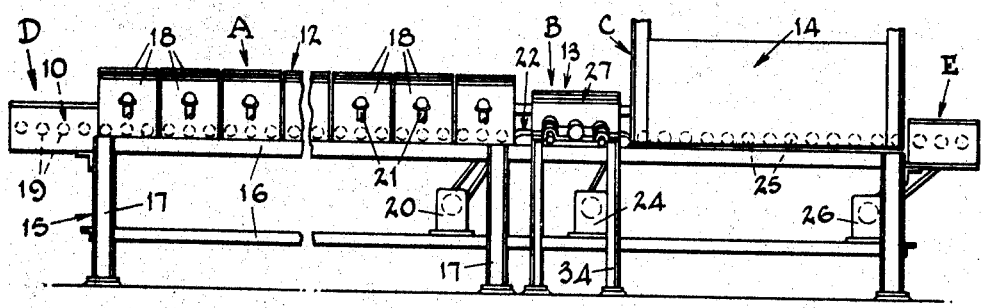
FIG. 1 is a side elevational view of a bending apparatus incorporating the novel features of the present invention.

In the production of bent and tempered glass sheets in relatively large quantities, such as would be encountered in the commercial production of glazing closures for automobiles or the like, it is advantageous to heat, bend and temper the sheets by a substantially continuous procedure. To this end, the sheets of glass may be moved successively one by one along a predetermined path through a heating area, a bending area and finally a chilling or tempering area, which areas are contiguous so that an individual sheet, upon being moved through one area, passes immediately into and through the following area.

For purposes of illustration, the present invention is shown in the drawings embodied in an apparatus for bending and tempering sheets of glass by a continuous procedure similar to that described above. The apparatus includes a conveyor system 10 operable to carry glass sheets 11 through a heating area A having means 12 for heating the sheets to a temperature corresponding to the softening point of the glass, a bending area B having means 13 for forming the sheets to the desired curvature and a cooling area C having means 14 for chilling from the elevated temperature to a temperature below the annealing range of the glass. These heating, bending and cooling means, 12, 13 and 14 respectively, are arranged in aligned relationship along a predetermined path defined by the conveyor system 10 which carries the sheets one by one through each of the aforementioned areas from a loading area D at one end of the path to a discharge area E at the opposite end of the path.

The heating, bending and cooling means together with the conveyor system 10 are carried by a supporting frame 15 comprising upper and lower rails 16 extending longitudinally along the path at opposite sides thereof and supported on vertically disposed pedestals 17.

As will be apparent from the following description, the apparatus may be readily adapted to bend sheets of various sizes having various outline configurations. Thus, while the drawings illustrate an apparatus adapted for bending comparatively small, triangularly shaped sheets of glass such as would be used for automobile ventilators or the like, the same apparatus with certain obvious modifications could be utilized for bending rectangular sheets of different sizes and shapes.

As brought out above, to be acceptable for use as automotive glazing closures, the surfaces of the sheets lying within the viewing area of the glazing closure should be free of any surface defects which would interfere with clear vision through the sheets. To avoid injuring the surfaces of the sheets as they are being heated, bent and tempered, the present apparatus is designed so as to require a minimum of physical contact with the major areas of the sheets. To this end, the sheets are balanced on one edge in a substantially vertical plane on the conveyor system as they are moved along the apparatus whereby physical contact with the major areas of the sheets may be limited to a small area or entirely avoided, depending upon the manner in which the sheets are balanced. For example, the sheets may be balanced on one edge by a support means which contacts a relatively small area of the sheet, which area does not lie within the viewing area of the finished window. By balancing the sheet in a slightly inclined plane in the manner illustrated in the drawings, physical contact between the means balancing the sheet and the surface of the sheet may be restricted to one side of the sheet.

Herein, the heating means 11, used to bring the sheets to the proper bending temperature, comprises heating cells 18 disposed in the heating area A on opposite sides of the path of movement of the sheets and extending upwardly from the path in planes parallel to the plane in which the sheets are supported. The sheets are moved along the path between the cells 18 on a roller-type conveyor 19 which forms a part of the conveyor system 10 and extends through the loading area D and the heating area A. This conveyor is driven by a suitable drive means 20 at a speed commensurate with proper heating of the glass. In the present instance, a number of cells are positioned side by side along the path to direct heat against the sheets as they are carried through the heating section, which cells may be individually controlled so as to progressively bring the sheets to the proper bending temperature as they move along the path.

While various heating devices could be employed in the cells, preferably to avoid contacting the surfaces of the sheets, the cells are designed to direct heated gases toward the path thereby providing cushions of hot gases on which the sheets float in the desired plane. The heated gases, or combustible fluids which are burned to produce the gases, may be brought to the cells 18 through individual pipes 21 connected to the cells. The gases introduced into the cells then escape through the faces of the cells toward the path to impinge on the sheets moving thereby.

After being heated and upon emerging from the heating area A, the sheets 11 are received on a second conveyor 22 which carries the sheets through the bending area B and past the bending means 13 which shapes the sheet to the desired curvature. The conveyor 22 comprises an endless belt or band 23, preferably of stainless steel or similar material able to withstand the heat to which the band is subjected, which receives the edge of the heated glass sheet. The band 23 is driven endwise by a suitable drive means 24 to advance the sheet past the bending means and into the cooling area C.

Upon entering the cooling area C, the curved glass sheets are received on a third conveyor section 25, also of the roller-type, arranged in end to end alignment with the conveyors 19 and 22 to complete the conveyor system 10. The conveyor 25 is driven by a drive unit 26 to move the sheets from the bending area B to the discharge area E between the cooling means 14 located adjacent the path.

Herein, the cooling means 14 includes blast heads disposed at opposite sides of the path and operable to direct a cooling medium such as air or the like against the opposite surfaces of the sheets. Here again, to avoid any mechanical contact with the major surfaces of the sheet, the blast heads may be so formed as to provide cushions of air between which the sheet floats, which cushions also effect the desired chilling of the sheets.

In general, the bending means 13 includes a shaping mold 27 comprising two mold parts 28 and 29, one disposed on each side of the path of movement of the sheets, which mold parts are movable relative to each other toward and away from the path thereby to press the heated sheets between complemental male and female shaping surfaces 30 formed on opposed faces of the mold parts. To this end, the mold parts 28 and 29 are carried by support means 31, with the shaping surfaces disposed substantially parallel to the plane of the glass sheets, for movement between an open position in which the mold parts are spaced apart on opposite sides of the path and a closed position in which the mold parts are in close proximity and adjacent the path.

The support means 31 for each of the mold parts includes a platform 32 slidable on a base 33 carried by pedestals 34 forming a part of the frame 15. Each mold part is secured to a base plae 35 which is bolted as at 36 to a mounting plate 37 upstanding from the forward end of each platform and secured thereto as by the illustrated gusset plates 38.

To carry the mold parts between the open and closed positions, each platform 32 is slidably guided on the base 33 for linear movement back and forth along a path extending substantially perpendicular to the path of movement of the sheets. In the illustrated embodiment wherein the sheets are supported in an inclined plane, the path along which the platforms move is also substantially perpendicular to the plane of the sheets.

For this purpose, each platform 32 is provided with bushings 39 fixed to its opposite sides and slidable along parallel rods 40 fixed to the upper end of posts 41 upstanding from and attached to the base 33 at opposite sides of the platform.

Figure 2:
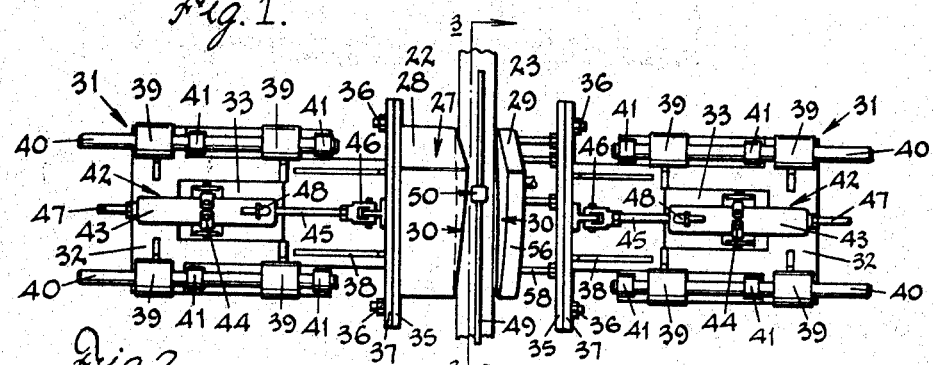
FIG. 2 is a plane view of a shaping mold constructed in accordance with the invention.
Figure 3:
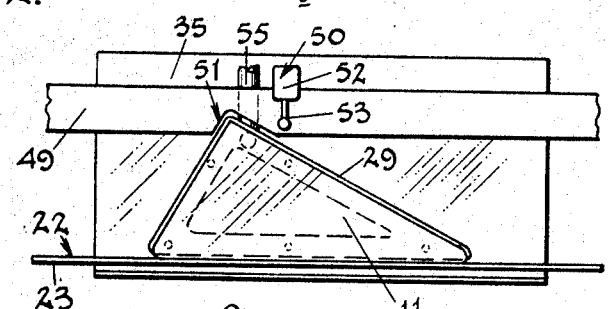
FIG. 3 is a view taken along line 3—3 of FIG. 2.

Reciprocation of each of the platforms 33 is effected, in the present instance, by a reversible actuator 42 acting between the base 33 and the platform. As shown in FIG. 2, the actuator comprises a double acting piston and cylinder arrangement 43 which is fixed to the base through the medium of a bracket 44 with the driven member or piston rod 45 attached to the mounting plate 37 on the platform by a clevis and pin coupling 46. Pressure fluid is selectively admitted into the cylinder through either of ports 47 or 48 to move the platform and the mold part carried thereby toward and away from the path of movement of the sheets.

In operation, as a heated sheet emerges from between the heating cells 18, wherein it is floated between the cushions of gases, its lowermost edge is received on the band 23 and its upper end slides along a guide bar 49 extending through the bending area B. As the sheet approaches the proper bending position between the shaping surfaces 30 on the mold parts 28 and 29, its presence is detected by suitable sensing means 50 which then produces a signal initiating a bending sequence in which the sheets are shaped between the mold parts. More particularly, as a heated sheet passes the sensing means 50 positioned just ahead of the shaping mold 27, a signal is sent through suitable conventional circuitry to a control system (not shown) regulating the flow of pressure fluid to the cylinders 43 to effect the introduction of fluid into the head end of each cylinder through ports 47 in sufficient quantity to move the mold parts, which are in the open position, toward the path and into an intermediate position adjacent the path. Upon further movement of the sheet, the upper edge thereof, which has been supported by the guide bar 49, drops into a notch 51 formed in the guide bar and rests against the shaping surface on one of the mold parts; the lowermost mold part in the embodiment illustrated. At this instance, the control system effects the interruption of the means 24 driving the conveyor to stop the forward movement of the sheet. Then, while the sheet is resting on the mold part, additional pressure fluid is admitted into the cylinder to move the mold parts into pressing engagement with the opposite surfaces of the sheets.

After the sheet is thus bent, pressure fluid is introduced into port 48 and exhausted from port 47 of the actuator coupled to the uppermost mold part to back off this mold part to the mold open position. The band 23 is then driven endwise to move the sheet past the shaping mold so that its upper end is once more resting against the guide bar 49 and simultaneously the second mold part 29 is backed off to a position spaced from the path, the mold open position, by introducing pressure fluid to the rod end of the cylinder. This bending sequence is repeated each time a heated sheet is moved past the sensing means 50.

While various sensing means 50 could be utilized, in the present instance, this means comprises a simple electric switch 52 carried by the guide bar 49 ahead of the shaping mold 27 and having a trip lever 53 projecting into the path of travel of the upper edge of the sheet as the latter moves along the path. In this manner, the lever 53 is tripped by the sheet as the latter approaches the proper bending position whereupon the switch 52 initiates the bending sequence through the medium of the system controlling the flow of pressure fluid to the cylinders 43 and the operation of the conveyor 22.

Figures 5, 6:
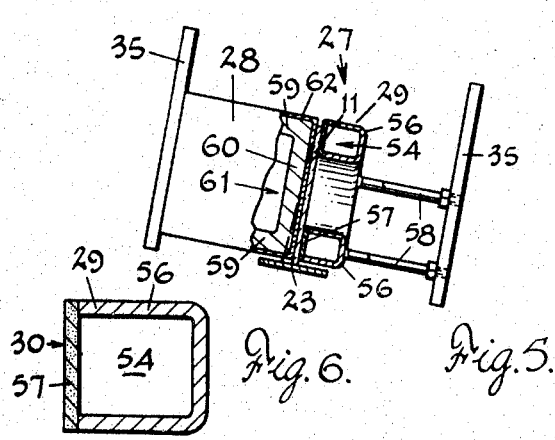
FIG. 5 is a view of the mold parts of the bending means showing them in pressing relationship with a glass sheet, parts being broken away and shown in section.
FIG. 6 is a transverse sectional view of the mold part shown in FIG. 4.

In the illustrated arrangement, a male shaping surface 30 is formed on the uppermost mold part 28 and is continuous so as to engage the entire surface of the glass sheet being bent. The other mold part 29, the lowermost part as shown in FIG. 5, comprises a ring-type structure adapted to engage the maginal portions of the sheet only and having a complemental female shaping surface formed thereon. During bending, when the shaping surfaces of the mold parts are brought into contact with the surfaces of the sheets, the latter are in a heat-softened condition and, therefore, very susceptible to being dented, scuffed or otherwise marred by any relative movement between the shaping surfaces and the sheets or by any imperfections which might exist on the shaping surfaces. In addition, the sheets may be damaged by thermal shock resulting from a rapid transfer of heat between the mold parts and the heated sheets. In this regard, it will be appreciated that a significant temperature differential would normally exist between the mold parts and the heated sheets. Thus when the sheets are contacted by the relative cool mold parts, heat is absorbed by the latter from the sheet and, depending upon the rate of heat transfer, can either break the sheet, cause chill cracks in the glass, or create unwanted stress of high magnitude in the glass. All of these defects would render the sheet unacceptable for its intended purpose.

To avoid damaging the sheets as a result of their contacting the mold, the present invention contemplates providing a cushioning film of aeriform fluid or gas, such as air or the like, between the shaping surfaces and the surfaces of the sheet which film acts as a separator medium preventing direct contact between the sheets and the shaping mold and, in addition, acts as an insulating medium between the sheets and the mold to retard the flow of heat therebetween.

To this end, the side of one or both of the mold parts facing the path and having the shaping surface thereon may be formed from a porous or permeable member or plate through which an aeriform fluid or gaseous medium may be forced to form a cushioning and insulating film of gas on the shaping surface of the mold part. It has been found that if a plate having minute pores and a controlled uniform porosity is utilized, the gas seeps very gently through the plate and forms an extremely thin surface film of gas which is evenly distributed over the shaping surface without any perceptible flow in the form of streams or blasts outwardly of the shaping surface. This quiescent film, which is contoured in the same manner as the shaping surface, acts as a separator medium preventing any direct contact between the shaping surface and the surface of the glass and further retarding the transfer of heat from the glass to the mold.

Porous plates suitable for the present purpose may be formed from any of a wide variety of materials including many different metals, refractories and resins. One form of plate which has proven to be satisfactory is formed of relatively finely powdered materials bonded together at their points of contact in any convenient manner leaving small voids between the particles, which voids intercommunicate to form tortuous passageways through which a gaseous medium may permeate.

While the exact flow characteristics of the gas through the plate are not fully appreciated, it is believed that the gas permeating through the minute tortuous channels in the plate, which channels offer substantial resistance to the flow of gas, appears at the shaping surface as thousands of extremely small, relatively high pressure air jets per square inch which flow for a very short distance beyond the face and then dissipate into the atmosphere. The net result is a very thin, hard, quiescent film of air on the shaping surface having the same contour as the shaping surface.

Plates having varying porosity characteristics may be utilized. For example, the porosity may vary from a plate having a mean pore size of 5 microns to a plate having a mean pore size of 165 microns. The pressure of the air utilized depends upon the porosity of the plate and on the thickness of the plate. Plates with the porosities specified above ranging in thickness from 1/16" to 1/2" may be utilized using a gas at a pressure ranging between 5 pounds per square inch and 90 pounds per square inch. The exact pressure utilized with a particular plate having any particular thickness, of course, depends upon the desired end result; the desired characteristics and thickness of the surface film to be formed on the shaping surface of the mold.

Figure 4:
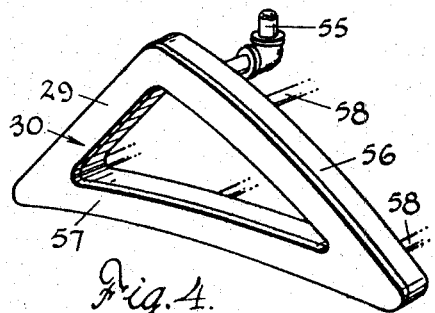
FIG. 4 is a perspective view of one of the mold parts forming a bending means.

It will be appreciated that either or both of the mold parts could be formed in such a manner as to provide the film of gas between the shaping surfaces and the sheets. However, for purposes of illustration, the invention is illustrated herein as incorporated in the ring-type mold part 29 having the female shaping surface formed thereon. In accordance with the invention then, as shown in FIGS. 4, 5 and 6, the ring-type mold part 29 is tubular in structure defining a closed chamber 54 coupled to a source (not shown) of pressurized gas, preferably air, by a suitable conduit 55. The face of the mold part on which the shaping surface is formed comprises a porous material so that the air seeps from the chamber 54 through the shaping surface thereby providing the film of air adjacent to and outwardly of this surface, which film will prevent direct contact between the shaping surface and the sheet being bent.

Herein, the ring-type mold part is in the form of a hollow channel 56, open sided, shaped in the form of a U and a plate 57 of air pervious material mounted on and closing the open side of the shannel to define the sealed air chamber 54. The U-shaped channel 56 may be formed of any of various materials, preferably metal, able to withstand the elevated temperatures to which the shaping mold will be repeatedly subjected during the continuous bending process. The plate 57 may be of porous metal such as sintered stainless steel or similar material through which pressurized air may seep. The plate 57 is welded to the free ends of the U-shaped channel 56 to form an air tight joint. This assembly, comprising the U-shaped channel 56 and the plate 57 is mounted on the base plate 35 through the medium of rods 58 extending therebetween with one end fixed to the rear of the U-shaped channel and the opposite ends threaded into the base plate.

By way of example, a mold part has been constructed in accordance with the present invention by utilizing a 1/8" thick plate of porous sintered stainless steel sold under the designation "Type H" by the Pall Trinity Micro Corporation, Cortland, N.Y. This plate has a mean pore size of 5 microns and by maintaining a pressure of 35 pounds per square inch in the chamber, the air seeps through the plate to provide the desired hard air film adjacent the shaping surface of the mold part.

While the present invention has been illustrated and, thus far, described in relation to the ring-type female mold part only, it will be appreciated that with certain obvious modifications the present invention may be incorporated also in the illustrated male mold part 28. As shown in FIG. 5, the male mold part 28 in the illustrated embodiment comprises a hollow structure made of metal or the like having side walls 59 and an integral end wall 60 defining a closed chamber 61. The shaping surface 30 is formed on the outer face of the end wall 60. The opposite end of this hollow structure is attached to the base plate. To minimize the heat transfer between the glass sheets and the mold part, the latter is provided with a heat resistant insulating cover 62.

To incorporate the present invention into this mold part, the end wall would be replaced with a plate of air pervious material of the type used in the plate 57. The hollow chamber may then be coupled by suitable conduits to a source of pressurized air.

From the foregoing, it will now be appreciated that, with a bending mold, constructed in accordance with the present invention, heat-softened glass sheets may be press bent to very precise curvatures while completely avoiding direct contact between the sheet and the shaping surface of the mold. In this way, the surface of the sheet is protected from damage due to scuffing and marring by the mold and from damage due to a rapid rate of heat transfer from the sheeet to the comparatively cool mold.

With the present mold, the actual pressing surface is a contoured quiescent film of air which both prevents the undesirable direct contact and acts as an insulation to retard the rate of heat transfer between the sheets and the bending mold.

By using a permeable, porous material having minute pores in the order of 5 to 165 microns, the air emerges from the shaping surface in the form of very small, high pressure jets which rapidly dissipate, and thus, in effect, form the very thin film which, due to the pressure and the number of jets per unit area, prevents direct contact with the sheets even when the bending mold is pressed against the surface of the sheet with sufficient force to bend the latter.

When air under pressure is directed through the shaping surface of a mold constructed in accordance with this invention, there is no appreciable movement of the air forming the film in the vicinity of the shaping surface but rather the shaping surface feels slippery to the touch as if it were completely covered with a lubricant of sufficient surface tension to guard against direct contact with the shaping surface.

It is to be understood that the form of the invention herewith shown and described is to be taken as a preferred embodiment of the same, and that various changes in the shape, size and arrangement of parts may be resorted to without departing from the spirit of the invention.

We claim:
1. Apparatus for bending glass sheets having, in combination, means for conveying the glass sheets to be bent successively, one by one along a predetermined path, said conveying means including means for supporting each sheet in a substantially vertical position with the lowermost edge resting on said conveying means and its uppermost portion sliding along a guide bar mounted above said path and extending therealong; a shaping mold having opposed mold parts located on opposite sides of said path and being aligned with each other transversely of the path; complemental shaping surfaces formed on opposed faces of said mold parts; means mounting said mold parts for movement relative to said path toward and away from each other between a first position wherein said shaping surfaces are spaced apart and second position wherein said shaping surfaces are in close proximity thereby to engage the opposite surfaces of a glass sheet disposed in said path and to press the sheet therebetween; means defining a notch in said guide bar opposite said mold parts whereby upon reaching this position the sheet is deposited against one of said mold parts; actuator means for shifting said mold parts between said first and second positions in response to the movement of a sheet along said path and into position between said mold parts, said opposed face on at least one of said mold parts comprising a porous permeable member having minute tortuous pores therethrough with said shaping surface being formed on one side thereof; and means introducing an aeriform fluid under pressure into said member to seep therethrough and form a thin, quiescent film of fluid on said shaping surface, whereby said film acts as a separator medium between said shaping surface and the surface of a sheet as the latter is pressed between said mold parts.

2. In apparatus for bending glass sheets as defined in claim 1, said porous member having a mean pore size between 5 and 165 microns.

3. In apparatus for bending glass sheets as defined in claim 1, wherein said member comprises a porous metal plate.

4. In apparatus for bending glass sheets as defined in claim 1, wherein said porous member comprises a sintered powdered stainless steel plate.

5. In apparatus for bending glass sheets as defined in claim 1, said means for introducing said aeriform fluid into said porous member comprising means defining a chamber carried by said mold part and having one side closed by said member, and means coupling said chamber to a source of aeriform fluid under pressure.

6. In apparatus for bending glass sheets as defined in claim 1, said porous member comprising an open ring conforming in outline to the outline of the sheet to be bent, whereby said shaping surface formed thereon contacts the marginal portions only of said sheet.

References Cited

UNITED STATES PATENTS

| | | | |
|---|---|---|---|
| 2,395,727 | 2/1946 | Devol | 65—182 X |
| 3,300,290 | 1/1967 | Misson | 65—25 X |
| 3,332,760 | 7/1967 | McMaster et al. | 65—182 X |
| 3,361,552 | 1/1968 | Ritter | 65—106 |

S. LEON BASHORE, Primary Examiner

ARTHUR D. KELLOGG, Assistant Examiner

U.S. Cl. X.R.

65—25, 106, 182, 273, 275, 374